(12) United States Patent
Jin et al.

(10) Patent No.: US 11,768,307 B2
(45) Date of Patent: Sep. 26, 2023

(54) MACHINE-LEARNING BASED FRACTURE-HIT DETECTION USING LOW-FREQUENCY DAS SIGNAL

(71) Applicant: ConocoPhillips Company, Houston, TX (US)

(72) Inventors: Ge Jin, Houston, TX (US); Kevin Mendoza, Houston, TX (US); Baishali Roy, Houston, TX (US); Darryl G. Buswell, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 669 days.

(21) Appl. No.: 16/815,378

(22) Filed: Mar. 11, 2020

(65) Prior Publication Data
US 2020/0309982 A1 Oct. 1, 2020

Related U.S. Application Data

(60) Provisional application No. 62/823,440, filed on Mar. 25, 2019.

(51) Int. Cl.
*G01V 1/50* (2006.01)
*E21B 47/14* (2006.01)
(Continued)

(52) U.S. Cl.
CPC ............... *G01V 1/50* (2013.01); *E21B 47/14* (2013.01); *G02B 6/4401* (2013.01); *G06F 17/18* (2013.01);
(Continued)

(58) Field of Classification Search
CPC .... G01V 1/50; G01V 2210/646; E21B 47/14; G06N 20/00; G06N 3/084; G02B 6/4401; G06F 17/18
See application file for complete search history.

(56) References Cited

U.S. PATENT DOCUMENTS 6,176,323 B1 1/2001 Weirich et al.
6,268,911 B1 7/2001 Tubel et al.
(Continued)

FOREIGN PATENT DOCUMENTS

GB  2 492 802  1/2013
WO  WO 01/48353  7/2001
(Continued)

OTHER PUBLICATIONS

Awada, A. et al.; "Is That Interference? A Work Flow for Identifying and Analyzing Communication Through Hydraulic Fractures in a Multiwell Pad", SPE Journal, Oct. 2016.
(Continued)

*Primary Examiner* — Elias Desta
(74) *Attorney, Agent, or Firm* — Polsinelli PC (57) ABSTRACT

Various aspects described herein relate to a machine learning based detecting of fracture hits in offset monitoring wells when designing hydraulic fracturing processes for a particular well. In one example, a computer-implemented method includes receiving a set of features for a first well proximate to a second well, the second well undergoing a hydraulic fracturing process for extraction of natural resources from underground formations; inputting the set of features into a trained neural network; and providing, as output of the trained neural network, a probability of a fracture hit at a location associated with the set of features in the first well during a given completion stage of the hydraulic fracturing process in the second well.

20 Claims, 8 Drawing Sheets

(51) Int. Cl.
G06N 3/084 (2023.01)
G06F 17/18 (2006.01)
G02B 6/44 (2006.01)
G06N 20/00 (2019.01)

(52) U.S. Cl.
CPC ............. *G06N 3/084* (2013.01); *G06N 20/00* (2019.01); *G01V 2210/646* (2013.01)

(56) References Cited

U.S. PATENT DOCUMENTS

| | | | |
|---|---|---|---|
| 9,752,406 | B2* | 9/2017 | Hardesty ................. E21B 43/26 |
| 10,012,748 | B2* | 7/2018 | Gupta ...................... G01V 1/50 |
| 2002/0180728 | A1 | 12/2002 | Neff et al. |
| 2003/0205375 | A1 | 11/2003 | Wright et al. |
| 2009/0194333 | A1 | 8/2009 | Macdonald |
| 2009/0326826 | A1 | 12/2009 | Hull et al. |
| 2010/0200743 | A1 | 8/2010 | Forster et al. |
| 2010/0200744 | A1 | 8/2010 | Pearce et al. |
| 2010/0284250 | A1 | 11/2010 | Cornish et al. |
| 2011/0019178 | A1 | 1/2011 | Vlatas |
| 2011/0188347 | A1 | 8/2011 | Thiercelin et al. |
| 2012/0017687 | A1 | 1/2012 | Davis et al. |
| 2012/0067118 | A1 | 3/2012 | Hartog et al. |
| 2012/0111560 | A1 | 5/2012 | Hill et al. |
| 2012/0133367 | A1 | 5/2012 | Bittar et al. |
| 2012/0147924 | A1 | 6/2012 | Hall |
| 2013/0211726 | A1 | 8/2013 | Mestayer et al. |
| 2013/0233537 | A1 | 9/2013 | McEwen-King et al. |
| 2014/0100274 | A1 | 4/2014 | Bobotas et al. |
| 2014/0246191 | A1 | 9/2014 | Zolezzi-Garreton |
| 2014/0358444 | A1 | 12/2014 | Friehauf et al. |
| 2015/0000932 | A1 | 1/2015 | O'Brien |
| 2015/0057934 | A1 | 2/2015 | Ma et al. |
| 2015/0083405 | A1 | 3/2015 | Dobroskok et al. |
| 2015/0146759 | A1 | 5/2015 | Johnston |
| 2015/0159478 | A1 | 6/2015 | Georgi et al. |
| 2016/0266276 | A1 | 9/2016 | Stokely et al. |
| 2016/0326859 | A1 | 11/2016 | Crews et al. |
| 2016/0356125 | A1 | 12/2016 | Bello et al. |
| 2017/0075006 | A1 | 3/2017 | Dusterhoft et al. |
| 2017/0260854 | A1 | 9/2017 | Jin et al. |
| 2017/0328181 | A1 | 11/2017 | Kristjansson et al. |
| 2017/0342814 | A1 | 11/2017 | Krueger et al. |
| 2018/0045040 | A1 | 2/2018 | Swan et al. |
| 2020/0104544 | A1* | 4/2020 | Suryadi ................... E21B 10/00 |

FOREIGN PATENT DOCUMENTS

| | | | |
|---|---|---|---|
| WO | WO 2013/092906 | 6/2013 | |
| WO | WO 2014/201316 | 12/2014 | |
| WO | WO 2015/065869 | 5/2015 | |
| WO | WO 2015/076976 | 5/2015 | |
| WO | WO 2015/094180 | 6/2015 | |
| WO | WO 2015/107332 | 7/2015 | |
| WO | WO 2015/170113 | 11/2015 | |
| WO | WO 2015/187140 | 12/2015 | |
| WO | WO 2015/187149 | 12/2015 | |
| WO | WO 2016/007161 | 1/2016 | |
| WO | WO-2016026815 A1* | 2/2016 | ............. G01V 1/284 |
| WO | WO 2016/069322 | 5/2016 | |
| WO | WO 2017/027340 | 2/2017 | |
| WO | WO 2017/039605 | 3/2017 | |
| WO | WO 2017/156339 | 9/2017 | |
| WO | WO-2018132786 A1 | 7/2018 | |
| WO | WO 2018/204920 | 11/2018 | |

OTHER PUBLICATIONS

Becker, Matthew W. et al.; "Measuring Hydraulic Connection in Fractured Bedrock with Periodic Hydraulic Tests and Distributed Acoustic Sensing", Proceedings, 41st Workshop on Geothermal Reservoir Engineering. Stanford University, Stanford, California, Feb. 22-24, 2016.

Boone, K.; "Monitoring Hydraulic Fracturing Operations Using Fiber-Optic Distributed Acoustic Sensing", Unconventional Resources Technology Conference, URTEC-2158449-MS, Jul. 20-22, 2015.
Bowman, Karen; "DAS Technology Expands Fiber Optic Applications for Oil, Gas Industry", Rigzone Staff, May 4, 2015.
Bukhamsin, Ahmed; Horne, Roland; "Cointerpretation of Distributed Acoustic Temperature Sensing for Improved Smart Well Inflow Profiling", Society of Petroleum Engineers, May 23-26, 2016.
Byrd, Richard H. et al.; "A Limited-Memory Algorithm for Bound-Constrained Optimization", Department of Electrical Engineering and Computer Science, May 1994.
Curtis, M.R. et al.; "Use of The Temperature Log for Determining Flow Rates In Producing Wells", Society of Petroleum Engineers of Aime, Sep. 30 to Oct. 3, 1973.
Daikin, J.P. et al.; "Distributed Optical Fibre Raman Temperature Sensor Using a Semiconductor Light Source and Detector", Electronics Letters, Jun. 20, 1985 vol. 21, No. 13.
Glasbergen, Gerard et al.; "Real-Time Fluid Distribution Determination in Matrix Treatments Using DTS", Society of Petroleum Engineers, Feb. 2009.
Grayson, Stephen et al.; "Monitoring Acid Stimulation Treaments in Naturally Fractured Reservoirs with Slickline Distributed Temperature Sensing", SPE International, Society of Petroleum Engineers. Mar. 24-25, 2015.
Hesthammer, J et al.; "From Seismic Data to Core Data: An Integrated Approach to Enhance Reservoir Characterization"; Geological Society, London, Special Publications, 209, pp. 39-54, Jan. 1, 2003.
Holley., E.H. et al.; "Interpreting Uncemented Multistage Hydraulic-Fracturing Completion Effectiveness by Use of Fiber-Optic DTS Injection Data", SPE Drilling & Completion, Sep. 2013.
Holley, E.H. et al.; "Using Distributed Optical Sensing to Constrain Fracture Models and Confirm Reservoir Coverage in the Permian Basin", Society of Petroleum Engineers, Feb. 4-6, 2014.
Jin, Ge; Roy, Baishali; "Hydraulic-Fracture geometry characterization using low-frequency DAS signal", The Leading Edge, Dec. 2017.
Johannessen, Kjetil et al.; "Distributed Acoustic Sensing—a new way of listening to your well/reservoir", SPE International, SPE 149602, Mar. 27-29, 2012.
Le Calvez, J.H. et al.; "Real-Time Microseismic Monitoring of Hydraulic Fracture Treatment: A Tool to Improve Completion and Reservoir Management", Society of Petroleum Engineers, Jan. 29-31, 2007.
Lord, D.L. et al.; "Study of Perforation Friction Pressure Employing a Large-Scale Fracturing Flow Simulator", Society of Petroleum Engineers, Sep. 25-28, 1994.
McKinley, R.M.; Bower, F.M.; "Specialized Applications of Noise Logging", Society of Petroleum Engineers, Nov. 1, 1979.
McKinley, R.M.; Bower, F.M.; Rumble, R.C.; "The Structure and Interpretation of Noise From Flow Behind Cemented Casing", Journal of Petroleum Technology, Mar. 1973.
Molenaar, M.M. et al.; "First Downhole Application of Distributed Acoustic Sensing for Hydraulic-Fracturing Monitoring and Diagnostics", SPE Drilling & Completion, Mar. 2012.
Molenaar et al., M.M.; "Real-Time Downhole Monitoring of Hydraulic Fracturing Treatments Using Fibre Optic Distributed Temperature and Acoustic Sensing", Society of Petroleum Engineers. Mar. 20-22, 2012.
Ouyang, Liang-Biao; Belanger, Dave; "Flow Profiling by Distributed Temperature Sensor (DTS) System-Expectation and Reality", Society of Petroleum Engineers Inc., Sep. 26-29, 2004.
Ouyang, Liang-Biao; Belanger, Dave; "Flow Profiling by Distributed Temperature Sensor (DTS) System-Expectation and Reality", May 2006 SPE Production & Operation.
Paleja., Rakesh et al.; "Velocity Tracking for Flow Monitoring and Production Profiling Using Distributed Acoustic Sensing", Society of Petroleum Engineers, Sep. 28-30, 2015.
Portis, Douglas H. et al.; "Searching for the Optimal Well Spacing in the Eagle Ford Shale: A Practical Tool-Kit", Unconventional Resources Technology Conferences, Aug. 12-14, 2013.
Ramey Jr., H.J. et al.; "Wellbore Heat Transmission", Society of Petroleum Engineers, Apr. 1962.

(56) References Cited

OTHER PUBLICATIONS

Raterman, Kevin T.; "Sampling a Stimulated Rock Volume: An Eagle for Example", Applied Geoscience Conference, 2018.
Rector III, J.W. et al.; "The Use of an Active Drill Bit for Inverse VSP Measurements", Exploration Geophysics, Dec. 6, 2018.
Sellwood, Stephen M. et al.; "An in-well heat-tracer-test method for evaluating borehole flow conditions", Springer-Verlag Berlin Heidelberg, Aug. 29, 2015.
Sierra, Jose et al.; "DTS Monitoring Data of Hydraulic Fracturing: Experiences and Lessons Learned", Society of Petroleum Engineers, 2008.
Van der Horst, Juun et al.; "Fiber Optic Sensing For Improved Wellbore Production Surveillance", International Petroleum Technology Conference, Jan. 20-22, 2014.
Vu-Hoang, D. et al.; "A Novel Approach to Production Logging in Multiphase Horizontal Wells", Society of Petroleum Engineers Inc., Sep. 28-29, 2004.
Webster., P. et al.; "Developments in Diagnostic Tools for Hydraulic Fracture Geometry Analysis", Unconventional Resources Technology Conference, Aug. 12-14, 2013.
Webster, P. et al.; "Micro-Seismic Detection using Distributed Acoustic Sensing", SEG Houston 2013 Annual Meeting. Aug. 12-14, 2013.
Wheaton, B. et al.; "A Case Study of Completion Effectiveness in the Eagle Ford Shale Using DAS/DTS Observations and Hydraulic Fracture Modeling", Society of Petroleum Engineers. Feb. 9-11, 2016.
Wu, Kan et al.; "Mechanism Analysis of Well Interference in Unconventional Reservoirs: Insights From Fracture-Geometry Simulation Between Two Horizontal Wells", Society of Petroleum Engineers, Feb. 23, 2017.
EP Patent Application No. 17764137.0 European Search Report dated Mar. 6, 2019.
EP Patent Application No. 17764143.8 European Search Report dated Mar. 4, 2019.
EP Patent Application No. 17764146.1 European Search Report dated Mar. 14, 2019.
EP Patent Application No. 17764150.3 European Search Report dated Mar. 4, 2019.
EP Patent Application No. 17764151.1 European Search Report dated Mar. 4, 2019.
EP Patent Application No. 18794756.9 European Search Report dated Apr. 14, 2020.
PCT Application PCT/US2017/021659 International Search Report and Written Opinion dated Jun. 1, 2017.
PCT Application PCT/US2017/021667 International Search Report and Written Opinion dated Jun. 1, 2017.
PCT Application PCT/US2017/021670 International Search Report and Written Opinion dated May 25, 2017.
PCT Application PCT/US2017/021674 International Search Report and Written Opinion dated May 25, 2017.
PCT Application PCT/US2017/021678 International Search Report and Written Opinion dated Jun. 1, 2017.
PCT Application PCT/US2017/021679 International Search Report and Written Opinion dated May 25, 2017.
PCT Application PCT/US2017/021681 International Search Report and Written Opinion dated May 22, 2017.
PCT Application PCT/US2018/031404 International Search Report and Written Opinion dated Jul. 13, 2018.
PCT Application PCT/US2018/056327 International Search Report and Written Opinion dated Dec. 21, 2018.
PCT Application PCT/US2019/030408 International Search Report and Written Opinion dated Jul. 22, 2019.
International Search Report and Written Opinion for International Application No. PCT/US2020/022052, dated Jun. 15, 2020, 9 pages.
Tyree R.M., "Predicting Frac Hits Using Artificial Intelligence; Application in Marcellus Shale," Department of Petroleum and Natural Gas Engineering, 2018, 63 Pages.
Extended European Search Report for Application No. 20778615.3 dated Oct. 27, 2022 (9 pages).

* cited by examiner

MACHINE-LEARNING BASED FRACTURE-HIT DETECTION USING LOW-FREQUENCY DAS SIGNAL

CLAIM OF PRIORITY

This application claims priority under 35 USC § 119(e) to U.S. Patent Application Ser. No. 62/823,440, filed Mar. 25, 2019, the entire contents of which are hereby incorporated by reference.

BACKGROUND

1. Field of The Invention

Aspects of the present disclosure generally relate to a process of machine learning based detecting of fracture hits in offset monitoring wells when designing hydraulic fracturing processes for a particular well and more specifically, to an automated/machine-learning based process for detecting locations of fracture hits in such offset monitor wells using low frequency Distributed Acoustic Sensing data.

2. Discussion of Related Art

A hydraulic fracturing process at a given well (horizontal or vertical) may impact nearby wells. Fiber Optic Sensing (FOS) technology and in particular Distributed Acoustic Sensing (DAS) has been utilized for detection of such impacts.

Hydraulic fracturing completion design has a big impact on the cost and production of unconventional wells for extraction of natural resources such as oil and natural gas. Plug-and-perforation (plug-and-perf) type completion has become popular in recent years due to its high efficiency on creating more evenly distributed hydraulic fractures in a reservoir. When designing a plug-and-perf completion, there are many parameters to be considered, including cluster spacing, number of clusters per stage, number of perforations per cluster, injection volume, proppant concentration, fluid type, usage of diverter, etc. All these parameters have an impact on the induced hydraulic fracture geometry, which is linked to production performance.

Fiber-Optic Sensing (FOS) technology has been used recently for the completion and production surveillance of horizontal unconventional wells. FOS provides spatial information that can improve completion optimization. The FOS technology utilizes the laser energy scattered by impurities within the fiber glass to measure temperature (Distributed Temperature Sensing (DTS)) and strain rate (Distributed Acoustic Sensing (DAS)) along the deployed fiber with high spatial resolution (~1 m).

Recent studies have demonstrated that the low-frequency (<0.05 Hz) component of a DAS signal recorded at an offset monitor well provides critical information to constrain hydraulic fracture geometry. The data can be used to estimate hydraulic fracture density, which can then be used to determine the cluster spacing for plug-and-perf designs.

Detecting of fracture hits at an offset monitoring well has so far remained a manual process whereby a technician, an engineer or a well operator, observes the DAS data and makes a subjective determination of existence of fracture-hits at nearby offset monitoring wells. This is an inefficient, costly and inconsistent way to detecting fracture hits in nearby offset monitoring wells.

BRIEF DESCRIPTION OF THE DRAWINGS

In order to describe the manner in which the above-recited and other advantages and features of the disclosure can be obtained, a more particular description of the principles briefly described above will be rendered by reference to specific example embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various example embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an example embodiment in the present disclosure can be references to the same example embodiment or any example embodiment; and, such references mean at least one of the example embodiments.

Reference to "one embodiment" or "an embodiment" means that a particular feature, structure, or characteristic described in connection with the example embodiment is included in at least one example embodiment of the disclosure. The appearances of the phrase "in one embodiment" in various places in the specification are not necessarily all referring to the same example embodiment, nor are separate or alternative example embodiments mutually exclusive of other example embodiments. Moreover, various features are described which may be exhibited by some example embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various example embodiments given in this specification.

Without intent to limit the scope of the disclosure, examples of instruments, apparatus, methods and their related results according to the example embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

SUMMARY

The present disclosure provides an improvement to conventional methods of identifying fracture hits in nearby offset monitoring wells while performing a hydraulic fracturing process in a given well (vertical or horizontal). More specifically, the improvement is provided by automatic prediction of fracture hits in a given offset monitoring well using machine-learning techniques, which eliminate currently utilized fracture hit identification methods that rely on subjective human interpretation of low frequency DAS signals, when designing hydraulic fracturing processes for a particular well.

In one aspect, a computer-implemented method includes receiving a set of features for a first well proximate to a second well, the second well undergoing a hydraulic fracturing process for extraction of natural resources from underground formations; inputting the set of features into a trained neural network; and providing, as output of the trained neural network, a probability of a fracture hit at a location associated with the set of features in the first well during a given completion stage of the hydraulic fracturing process in the second well.

In another aspect, the set of features corresponding to an acoustic channel along a fiber optic cable used within the first well for distributed acoustic sensing of fracture hits in the first well from the second well.

In another aspect, the probability of the fracture hit is used in designing plug-and-pref hydraulic fracturing process in the second well.

In another aspect, the computer-implemented method further includes training the neural network using a set of low frequency distributed acoustic sensing based data collected from a network of wells formed of a plurality of pairs of injecting-monitoring well pairs.

In another aspect, wherein the training includes manually identified fracture hits within the data, at one or more acoustic channels within one of more monitoring wells of the network.

In another aspect, the set of features includes a first summation strain rate at the location during a set period; first filtered data corresponding to the first summation strain rate; a second summation strain rate at the location after the set period; second filtered data corresponding to the second summation strain rate; a Root Mean Square (RMS) of individual channel amplitudes during the set period; third filtered data corresponding to the RMS; a sum of absolute values of a difference between an acoustic channel corresponding to the location and locations that are a threshold number of acoustic channels apart from the acoustic channel; and fourth filtered data corresponding to the sum of the absolute values.

In another aspect, the second well is a horizontal well.

In one aspect, a system includes memory having computer-readable instruction stored therein, and one or more processors. The one or more processors are configured to execute the computer-readable instructions to receive a set of features for a first well proximate to a second well, the second well undergoing a hydraulic fracturing process for extraction of natural resources from underground formations; input the set of features into a trained neural network; and provide, as output of the trained neural network, a probability of a fracture hit at a location associated with the set of features in the first well during a given completion stage of the hydraulic fracturing process in the second well.

In another aspect, the set of features corresponding to an acoustic channel along a fiber optic cable used within the first well for distributed acoustic sensing of fracture hits in the first well from the second well.

In another aspect, the probability of the fracture hit is used in designing plug-and-pref hydraulic fracturing process in the second well.

In another aspect, the one or more processors are further configured to execute the computer-readable instructions to train the neural network using a set of low frequency distributed acoustic sensing based data collected from a network of wells formed of a plurality of pairs of injecting-monitoring well pairs.

In another aspect, the one or more processors are further configured to execute the computer-readable instructions to train the neural network based on manually identified fracture hits within the data, at one or more acoustic channels within one of more monitoring wells of the network.

In another aspect, the set of features includes a first summation strain rate at the location during a set period; first filtered data corresponding to the first summation strain rate; a second summation strain rate at the location after the set period; second filtered data corresponding to the second summation strain rate; a Root Mean Square (RMS) of individual channel amplitudes during the set period; third filtered data corresponding to the RMS; a sum of absolute values of a difference between an acoustic channel corresponding to the location and locations that are a threshold number of acoustic channels apart from the acoustic channel; and fourth filtered data corresponding to the sum of the absolute values.

In another aspect, the second well is a horizontal well.

In one aspect, one or more non-transitory computer-readable medium have computer-readable instructions, which when executed by one or more processors, cause the one or more processors to receive a set of features for a first well proximate to a second well, the second well undergoing a hydraulic fracturing process for extraction of natural resources from underground formations; input the set of features into a trained neural network; and provide, as output of the trained neural network, a probability of a fracture hit at a location associated with the set of features in the first well during a given completion stage of the hydraulic fracturing process in the second well.

In another aspect, the set of features corresponding to an acoustic channel along a fiber optic cable used within the first well for distributed acoustic sensing of fracture hits in the first well from the second well.

In another aspect, the probability of the fracture hit is used in designing plug-and-pref hydraulic fracturing process in the second well.

In another aspect, execution of the computer-readable instructions further cause the one or more processors to train the neural network using a set of low frequency distributed acoustic sensing based data collected from a network of wells formed of a plurality of pairs of injecting-monitoring well pairs.

In another aspect, execution of the computer-readable instructions further cause the one or more processors to train the neural network based on manually identified fracture hits within the data, at one or more acoustic channels within one of more monitoring wells of the network.

In another aspect, the set of features includes a first summation strain rate at the location during a set period; first filtered data corresponding to the first summation strain rate; a second summation strain rate at the location after the set period; second filtered data corresponding to the second summation strain rate; a Root Mean Square (RMS) of individual channel amplitudes during the set period; third filtered data corresponding to the RMS; a sum of absolute values of a difference between an acoustic channel corresponding to the location and locations that are a threshold number of acoustic channels apart from the acoustic channel; and fourth filtered data corresponding to the sum of the absolute values.

In another aspect, the second well is a horizontal well.

DESCRIPTION OF EXAMPLE EMBODIMENTS

The disclosure begins with a description of an example environment, in which the methods and systems for machine learning based signal recovery may be utilized.

Figure 1:
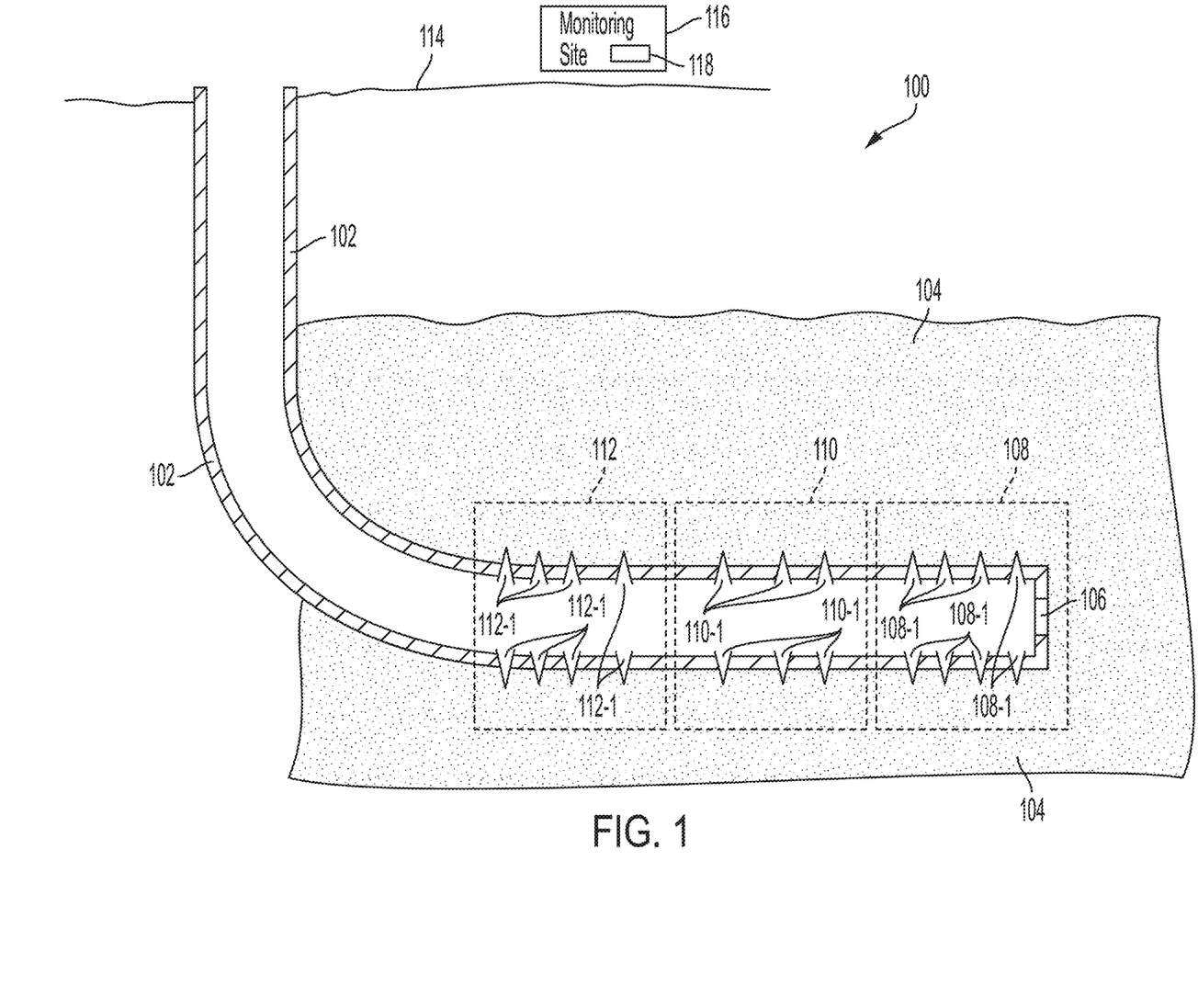
FIG. 1 illustrates an example well in which a hydraulic fracturing process is to be performed, according to an aspect of the present disclosure.

FIG. 1 illustrates an example well for hydraulic fracturing, according to an aspect of the present disclosure. As shown in FIG. 1, environment 100 has a well 101 may have been drilled according to any known or to be developed method of drilling vertical and/or horizontal wells for hydraulic fracturing to extract natural resources through cracking of formations accessed through well 101. Well 101 may have a casing 102 formed of cement. While a single layer of the casing 102 is shown in FIG. 1, depending on location and geological properties of various subsurface layers, more casings may be put in place to ensure environmental and/or operational safety of well 101. In example of FIG. 1, subsurface formation 104 may have natural resources trapped therein, which can be extracted through a fracking process.

FIG. 1 illustrates examples of 3 stages of holes created within the formation 104 during a plug and perforation process. Starting at end portion 106 of well 101, a bridge plug and a perforation gun are lowered into stage 108. Once the bridge plug is set, the perf gun fires to create holes 108-1 in the casing 102 and penetrate the formation 104. Holes 108-1 may be created within both bottom portion and upper portion of casing 102 as shown within stage 108. A spacing between any two adjacent holes 108-1 may be referred to as fracture spacing or cluster spacing.

The same process as above may be repeated to create holes 110-1 within stage 110 and holes 112-1 within stage 112. This process may be referred to as a plug-and-perf design of a well for creating stages 108, 110 and 112, which may also be referred to as clusters 108, 110 and 112.

As can be seen from FIG. 1, fracture spacings within each stage may be the same such that a distance between any two holes within each stage is the same. In another example, the spacing between a pair of adjacent holes in stage 108 can be different from another pair of adjacent holes in the same stage 108. In another example, cluster spacings may be different in two different stages or may be the same. For example, cluster spacing between a pair of adjacent holes 108-1 in stage 108 may be the same as cluster spacing between a pair of adjacent holes 110-1 in stage 110 or may be different.

Cluster spacing may be determined by the reservoir/formation 104's permeability and stress anisotropy (difference between maximum and minimum horizontal stress). In low-permeability formations, large cluster spacing designs may drain the formation inefficiently due to the sparse-distributed hydraulic fractures. On the other hand, if the cluster spacing is too small, the stress shadow interference between the nearby fractures may cause inefficient fracture growth, which leads to unnecessary completion cost.

Holes 108-1, 110-1 and 112-1 may be used for injecting fluids, sands and chemicals into cracks within the formation 104 and eventually receiving released natural resources and water back within well 101 for extraction and transfer to surface 114.

Environment 100 further illustrates a monitoring site 116, which may be located at or near well 100 or may be remotely located but communicatively coupled to instruments and sensors deployed within well 100 for performing hydraulic fracturing. Monitoring site 116 may include one or more terminals such as terminal 118. Terminal 118 processors, servers, etc., which may implement computer-readable instructions to implement the machine-learning based process of predicting locations of fracture hits within monitoring wells, according to the present disclosure. Example device architecture of terminal 118 will be described below with reference to FIG. 8.

With a non-limiting example of a well for hydraulic fracturing and extraction of natural resources described above with reference to FIG. 1, the disclosure now turns to describing example embodiments for detecting fracture hits within an offset monitoring well.

As noted above, in designing a plug-and-perf completion of a well (an example of which is described above with reference to FIG. 1), there are many parameters to be determined, including but not limited to, cluster spacing, number of clusters per stage, number of perforations per cluster, injection volume, proppant concentration, fluid type, usage of diverter, and so on. All these parameters have an impact on the induced hydraulic fracture geometry, which is linked to production performance. As also noted above, Low Frequency Distributed Acoustic Sensing (LFDAS) signals (e.g., less than 0.05 Hz) have been used to detect fracture hits at offset monitoring wells during hydraulic fracturing operations that can provide critical information to constrain hydraulic fracture geometry. LFDAS can locate fracture hit at an offset monitor well with a spatial resolution less than 5 meters. The data can be used to estimate hydraulic fracture density, which is critical to determine the cluster spacing for plug-and-perf designs.

Fracture hits in LFDAS signals can be interpreted as fiber locations, along casing of a monitoring well (neighboring well), that experience strong extension (fracture opening) during a pumping period, and strong but gradually decreasing compression after the pump stops. In contrast, the fiber sections that are adjacent to the fracture hits should experience compression (stress shadow) during the pumping period and extension (relaxation) after pumping has stopped. Currently, human expertise have to be relied upon for reading LFDAS data to identify locations of fracture hits in a neighboring/monitoring well, which is subjective and time-consuming.

As will be described below, an objective and automated process is introduced for identification and estimation of locations of fracture hits using machine learning techniques. Using such technique, field data on actual fracture hits, under a set of assumptions, parameters and constraints, are collected for training a Neural Network Architecture (NNA). Such data, as will be described below, is used for training, validation and testing of the selected NNA.

Hereinafter, an example setup of a network of fracked and monitoring wells are described together with any relevant set of assumptions for collecting LFDAS data.

Figure 2:
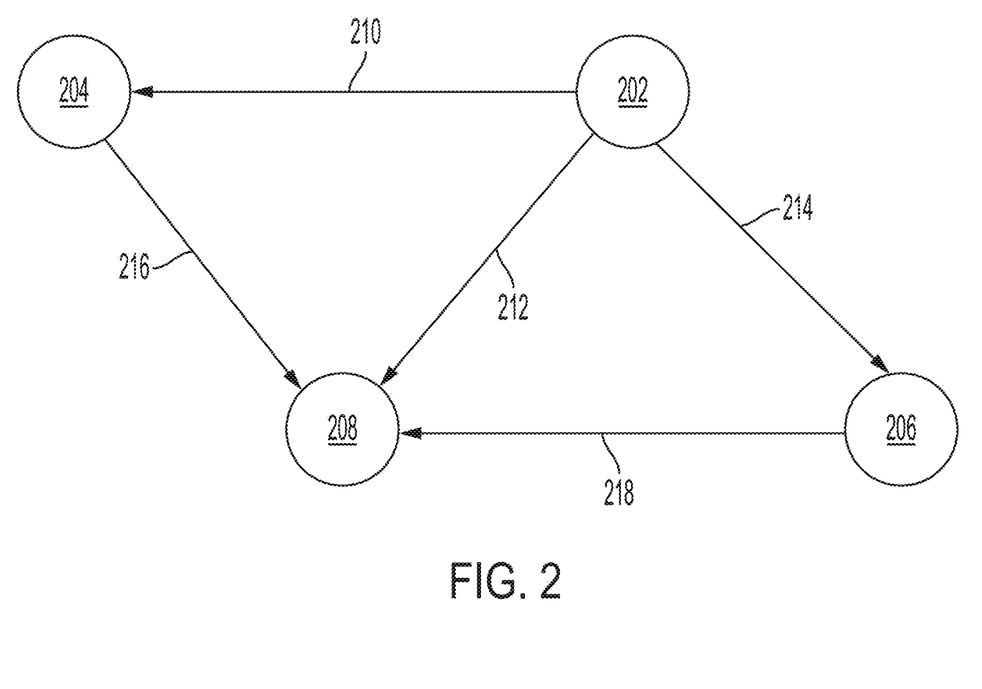
FIG. 2 illustrates a network of four instrumented wells for collecting LFDAS data, according to an aspect of the present disclosure.

FIG. 2 illustrates a network of four instrumented wells for collecting LFDAS data, according to an aspect of the present disclosure. Network 200 of 4 instrumented wells provides a gun barrel view of 4 wells 202, 204, 206 and 208, each of which is located at a horizontal distance (e.g., 50 ft, 100 ft, 300 ft, 600 ft, etc.) from neighboring/adjacent ones of wells 202, 204, 206 and 208. Fracking sequence of network 200 may be well 202, well 204, well 206 and well 208. That is, an assumption is made that well 202 will be fracked first, followed by well 204, well 206 and then well 208. Any well to be fracked can have multiple fracking stages designed in a similar manner as described with reference to well 101 of FIG. 1 and with more or less number of stages than well 101. A well that is being fracked may also be referred to as an injection well.

Furthermore, for purposes of describing example embodiments of the present application, an assumption is made that wells 202 and 206 are completed with a cluster spacing of L between respective holes, while wells 204 and 208 are completed with a cluster spacing of 2 L, where L is a positive number expressed in meters.

Fracture hit may be observed in an offset monitoring well that is not cracked. Therefore, when well 202 is fracked, wells 204, 206 and 208 are offset monitoring wells or simply monitoring wells. Well 202 may form an injection monitoring well pair indicated by a unidirectional arrow from the injection well to the monitoring well. For example, arrow 210 indicates that well 202 is the injection well and well 204 is the monitoring well in the injection-monitoring well pair 202-204. Furthermore, arrow 212 indicates that well 202 is the injection well and well 206 is the monitoring well in the injection-monitoring well pair 202-206. Also, arrow 214 indicates that well 202 is the injection well and well 208 is the monitoring well in the injection-monitoring well pair 202-208.

When well 204 is being fracked, only well 208 can be an offset monitoring well forming the injection-monitoring well pair 204-208 indicated by arrow 216. However, well 202 cannot be a monitoring well when well 204 is being fracked, since well 202 is fracked prior to well 204.

Moreover, in example of FIG. 2, when well 206 is being fracked, only well 208 can be an offset monitoring well forming the injection-monitoring well pair 206-208 indicated by arrow 218. However, well 202 cannot be a monitoring well when well 206 is being fracked, since well 202 is fracked prior to well 206.

Lastly, in example of FIG. 2, when well 208 is being fracked, none of wells 202 and 206 can be monitoring wells since wells 202 and 206 are fracked prior to well 208.

Accordingly, non-limiting example of FIG. 2, illustrates 5 injection-monitoring well pairs, each indicated by one of unidirectional arrows 210, 212, 214, 216 and 218.

Furthermore, an assumption is made that fiber cables used for collecting LFDAS data in monitoring wells are stripped outside casing of each monitoring well (e.g., similar to casing 102 of FIG. 1) and cemented in place to ensure the mechanical coupling with the formation, such as the formation 104 of FIG. 1

Using setup of network 200, DAS data are recorded in each monitoring well using a 5-m gauge length fiber cables (i.e., 5 meter long fiber cables), with 1-m acoustic channel spacing output, and the raw data are sampled at 10 kHz. The data are first down sampled to 1 s after a low-pass anti-aliasing filter, and then two-dimensional median filtered with a 5-channel (five 1 meter acoustic channels over the 5 meter length of the fiber cable) and 10-second window. The data may then be further low-pass filtered with a corner frequency of 0.05 Hz to get LFDAS data, that may be used for training, validation and testing of an NNA model. Accordingly, such LFDAS data may be compiled in a 2-dimensiolan (channel and time) matrix.

Figure 3:
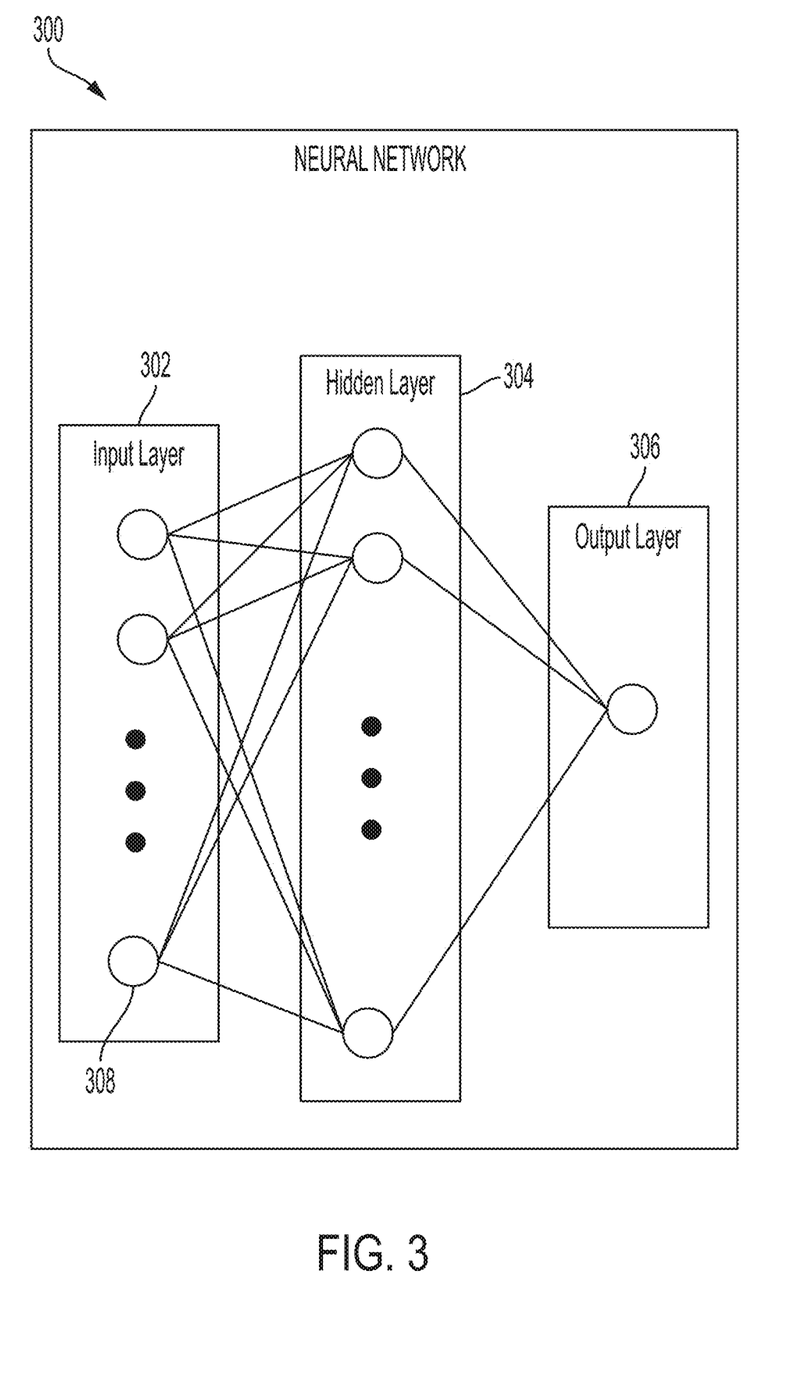
FIG. 3 illustrates an example configuration of a neural network, according to one aspect of the present disclosure.

FIG. 3 illustrates an example configuration of a neural network, according to one aspect of the present disclosure. In this example, neural network (NNA) 300 includes an input layer 302 which includes input data, such as features of a monitoring well (as will be described below). Input layer 302 can have m number of nodes such as node 308, where m is equal to or greater than one. In one example of the present application, input layer 302 has 8 nodes.

The neural network 300 includes a hidden layer 304. However, a number of hidden layers is not limited to one and may be more to achieve various levels of architectures and complexities as needed for an underlying application.

Furthermore, each hidden layer can have a p number of nodes, where p is equal to or greater than one. In one example embodiment of the present application, single hidden layer 304 has 10 nodes.

Neural network 300 further includes an output layer 306 that provides an output resulting from the processing performed by hidden layer 304 on input data received at input layer 302. In one illustrative example, output layer 306 can provide a probability of a location of a fracture hit in a neighboring/monitoring well, as will be described below. Output layer 306 can have q number of nodes, where q is equal to or greater than one. In one example embodiment of the present application, output layer 306 has 1 node.

Any number of nodes at any given layer of neural network 300 may be connected to one or more nodes at a different layer of neural network 300. In one example embodiment of the present application, each node in input layer 302 is connected to every node in hidden layer 304 and every node in hidden layer 304 is connected to output node at output layer 306.

Information associated with nodes of neural network 300 may be shared among the different layers and each layer retains information as information is processed. In some cases, neural network 300 can include a feed-forward network, in which case there are no feedback connections where outputs of the network are fed back into itself. In some cases, neural network 300 can include a recurrent neural network, which can have loops that allow information to be carried across nodes while reading in input.

Information can be exchanged between nodes through node-to-node interconnections between the various layers. Nodes of the input layer 302 can activate a set of nodes in hidden layer 304. For example, as shown, each of the input nodes of input layer 302 is connected to each of the nodes of hidden layer 304.

Nodes of hidden layer 304 can transform the information of each input node by applying activation functions to the information. The information derived from the transformation can then be passed to and can activate nodes of the next layer (e.g., node of output layer 306). If neural network 300 has more than one hidden layer, then information derived from the transformation can then be passed to and can activate nodes of the next layer (e.g., hidden layer 304B), which can perform their own designated functions. Example functions include convolutional, up-sampling, data transformation, pooling, rectified linear unit and/or any other suitable functions.

In some cases, each node or interconnection between nodes can have a weight that is a set of parameters derived from the training of neural network 300. For example, an interconnection between nodes can represent a piece of information learned about the interconnected nodes. The interconnection can have a numeric weight that can be tuned (e.g., based on a training dataset), allowing neural network 300 to be adaptive to inputs and able to learn as more data is processed.

Neural network 300 can be pre-trained to process the features from the data in input layer 302 using hidden layer 304 in order to provide the output through output layer 306. Hidden layer 304 may be trained using a set of training data obtained by observing LFDAS signals at monitoring wells, as will be described below.

In some cases, neural network 300 can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training data until neural network 300 is trained enough so that the weights of the layers are accurately tuned.

A loss function can be used to analyze errors in the output. Any suitable loss function definition can be used. The loss (or error) can be high for the initial training data since the actual values will be different than the predicted output. The goal of training is to minimize the amount of loss so that the predicted output is the same as the training label. Neural network 300 can perform a backward pass by determining which inputs (weights) most contributed to the loss of the network, and can adjust the weights so that the loss decreases and is eventually minimized.

A derivative of the loss with respect to the weights can be computed to determine the weights that contributed most to the loss of the network. After the derivative is computed, a weight update can be performed by updating the weights of the filters. For example, the weights can be updated so that they change in the opposite direction of the gradient. A learning rate can be set to any suitable value, with a high learning rate including larger weight updates and a lower value indicating smaller weight updates.

With an example network 200 for collecting LFDAS data and an example NNA 300 (neural network 300) described, the disclosure now turns to describing example processes for training NNA 300 using LFDAS data collected from network 200.

Figure 4:
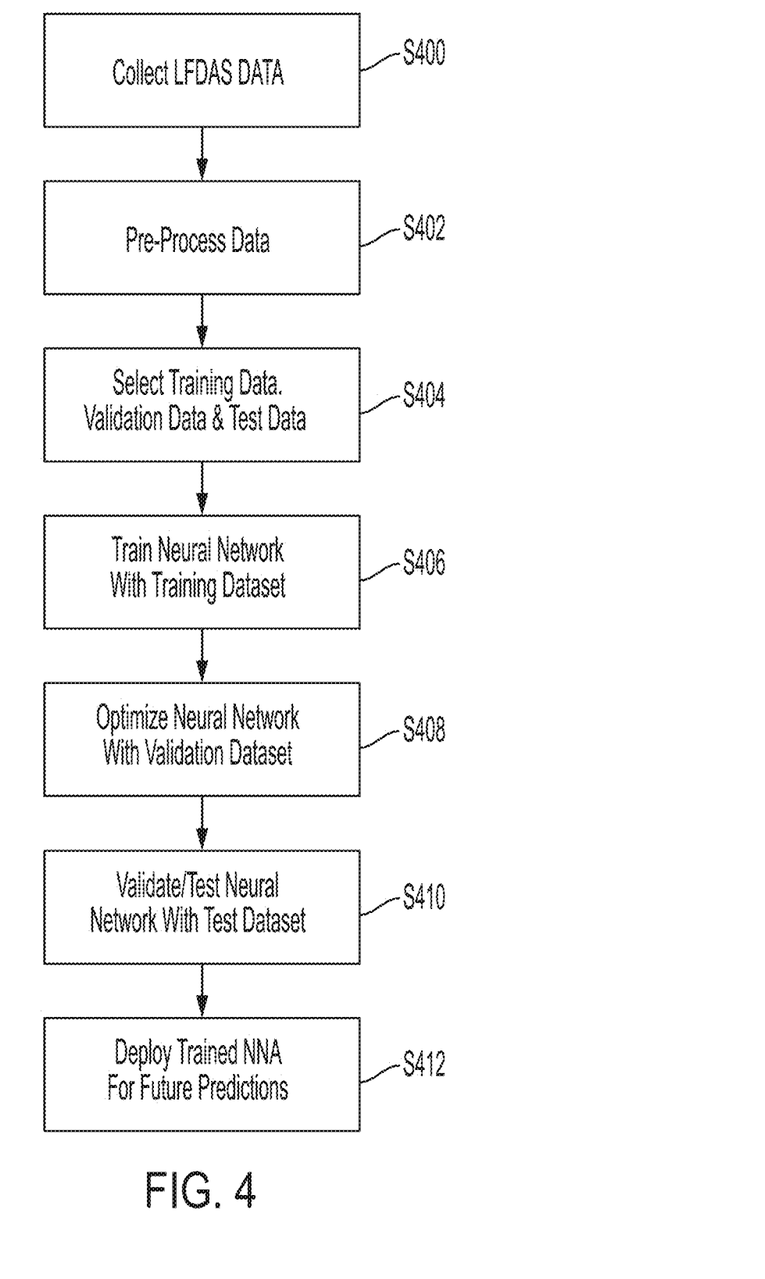
FIG. 4 describes an example process of training neural network of FIG. 3, according to an aspect of the present disclosure.

FIG. 4 describes an example process of training neural network of FIG. 3, according to an aspect of the present disclosure. FIG. 4 will be described from the perspective of terminal 118. However, it will be understood that terminal 118 can have one or more processors configured to execute computer-readable instructions stored on one or more associated memories to implement functionalities of FIG. 4. While terminal 118 is used as an example device at which neural network 300 can be trained, the training need not be performed at terminal 118 but can instead be performed at any one or more remote terminals (e.g., cloud based) using LFDAS data collected from network 200. FIG. 4 may be described in relation to any one or more of FIGS. 1-3.

At S400, LFDAS are received at terminal 118, which are recorded as described above from network 200.

At S402, terminal 118 preprocesses the LFDAS received at S400. In one example, LFDAS data are split into sections by completion stages. An example time window for the data splitting is selected to be one hour before the pumping started (pumping of sand and water at each stage for extracting trapped natural resources) and two hours after the pumping stopped for each stage. In one example case, there can be 76 stages from 5 injection-monitor well pairs of network 200 being recorded. As part of the preprocessing, fracture hits in the data are manually picked to serve as a labeled dataset. In one example, because the spatial resolution of the gauge data is 5 channels (meters), a 5-channel window may be assigned to each manually picked fracture hit as positive samples. This can result in a 2-dimensional (2-D) LFDAS data set of positive hits (manually identified fracture hits) along a time and dimension domain.

In one example, the 2-D LFDAS data are transformed into eight one-dimensional features in the channel axis. The features are designed to characterize a corresponding fracture-hit signal from different perspectives. Examples of one-dimensional features include: (1) $\varepsilon_d$, which may be defined as the summation of strain rate during pumping period (For $\varepsilon_d$, channels with fracture hits show strong positive value, and channels in the stress shadow show negative values); (2), $\varepsilon_p$, which may be defined as the strain rate summation during the example 2 hours after pumping stops, where fracture-hit channels show strong negative values and the surroundings show positive; (3) Feature A, which may indicate a Root Mean Square (RMS) of individual channel amplitudes during pumping period to capture large amplitude variation at the fracture hits during pumping; (4) Feature D, which may indicate a sum of the absolute values of the difference between a channel with the channels that are three channels apart (1-m channel spacing and 5-m gauge length) (because the geometry of the fracture hits can be smaller than DAS spatial resolution, the signal polarity at fracture hit channels should be different than the channels half a gauge length away); (5) $F_H(\varepsilon_d)$, which can be a high-pass filtered version of $\varepsilon_d$ with an example high-pass filter in channel with a corner wavelength of 30 channels (100 ft); (6) $F_H(\varepsilon_p)$, which can be a high-pass filtered version of $\varepsilon_p$ with an example high-pass filter in channel with a corner wavelength of 30 channels (100 ft); (7) $F_H(A)$, which can be a high-pass filtered version of Feature A, with an example high-pass filter in channel with a corner wavelength of 30 channels (100 ft); and (8) $F_H(D)$, which can be a high-pass filtered version of Feature D, with an example high-pass filter in channel with a corner wavelength of 30 channels (100 ft). These example features may form a set of features and may vary from one acoustic channel to another.

In one example, above features are then normalized based on individual injection-monitor well pairs, since different well spacing may generate different strain strength. The normalization can be performed by standardization, which makes each feature zero mean and unit-variance. The normalization process can be presented as:

$$f'=f-\bar{f}/\sigma$$

where $\bar{f}$ is the mean of feature f (with feature f being any one of the above example 8 features) and $\sigma$ is the standard deviation of the feature. The pre-processed LFDAS data may be obtained after performing the normalization process on each feature described above.

Figure 5:
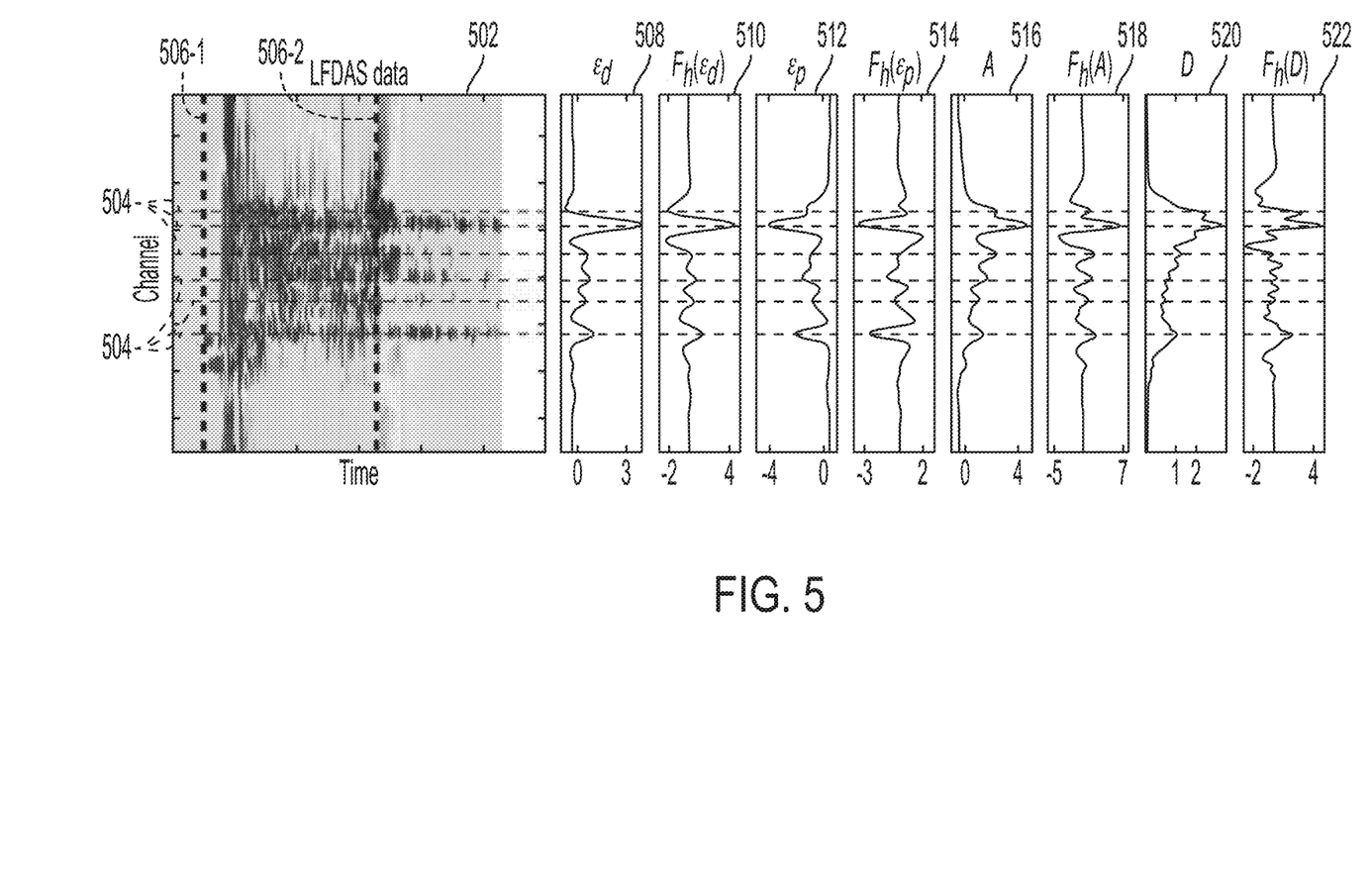
FIG. 5 is an example illustration of original LFDAS data and pre-processed LFDAS data, according to an aspect of the present disclosure.

FIG. 5 is an example illustration of original LFDAS data and pre-processed LFDAS data, according to an aspect of the present disclosure. As shown in FIG. 5, map 502 is the original 2-D LFDAS data set (as received at S400), with manually identified fracture hits locations. These locations are shown by dashed lines 504. Vertical dashed lines 506-1 and 506-2 indicate the beginning and end of example pumping period during each stage used in determining the example time window for data splitting, as described above. Map 502, if shown in color, can include different colors (e.g., red and blue) to show extensions and contractions in monitoring/neighboring wells, as described above.

Each of example features (8 features) described above are also illustrated by graphs 508, 510, 512, 514, 516, 518, 520 and 522, with each being identified with the corresponding normalized feature (e.g., graph 508 is the normalized representation of feature $\varepsilon_d$, etc.). In example of FIG. 5, $\varepsilon_d$, $F_H(\varepsilon_d)$, A, and $F_H(A)$ are determined using the LFDAS data between the two dashed lines 506-1 and 506-2 (e.g., 0.5-3.2 hr), $\varepsilon_p$ and $F_H(\varepsilon_p)$ are calculated from the LFDAS data after the dashed line 506-2 (3.2 hours), and D and $F_H(D)$ are calculated using the entire LFDAS data frame.

With a pre-processed set of LFDAS data, at S404, terminal 118 selects a portion (first subset) of the pre-processed data as training dataset for training neural network 300, another portion (second subset) of the pre-processed data as validation dataset for optimizing the hyperparameters of neural network 300 and another portion (third subset) of the pre-processed data as test dataset for evaluating/testing trained neural network 300.

In one example, instead of splitting the pre-processed set of LFDAS data by percentages (e.g., 60% for training, 20% for validation and 20% for testing), pre-processed data from all stages (e.g., stages 108, 110 and 112) in injection-monitoring well pair of wells 202-204 and pre-processed data from all stages (e.g., stages 108, 110 and 112) in injection-monitoring well pair of wells 206-208 are used as test dataset (third dataset). Within remaining injection-monitoring well pairs of example network 200 (e.g., injection-monitoring well pair of wells 204-208, injection-monitoring well pair of wells 202-208 and injection-monitoring well pair of wells 202-206), 45 stages may randomly be selected as the training dataset (first subset) and 10 stages may be selected as validation dataset (second subset).

In one example, for each stage in the training and validation datasets, only channels within the range of 10 channels below the toe-most fracture-hit channel are selected to avoid the interference from the fractures generated by previous stages, and 100 channels above the heel-most one are selected to exclude low-amplitude negative samples. This channel selection may result 6426 samples in the training set, within which 794 samples are channels labelled as fracture hits. The positive samples are duplicated (e.g., 4 times) to increase their percentage in the training dataset.

At S406, terminal 118 uses the training dataset to train neural network 300.

At S408, terminal 118 optimizes hyperparameters of the training of neural network 300 using the training dataset.

At S410, terminal 118 validates trained and optimized neural network 300 using test dataset.

At S412 and upon validating trained and optimized neural network 300, terminal 118 may deploy neural network 300 for use in future designing of fracturing processes such as the design of plug-and-perf process.

With a trained neural network 300 for predicting locations of fracture hits within neighboring/monitoring well(s), the disclosure now turns to describing examples of utilizing trained neural network 300 for predicting locations of fracture hits.

Figure 6:
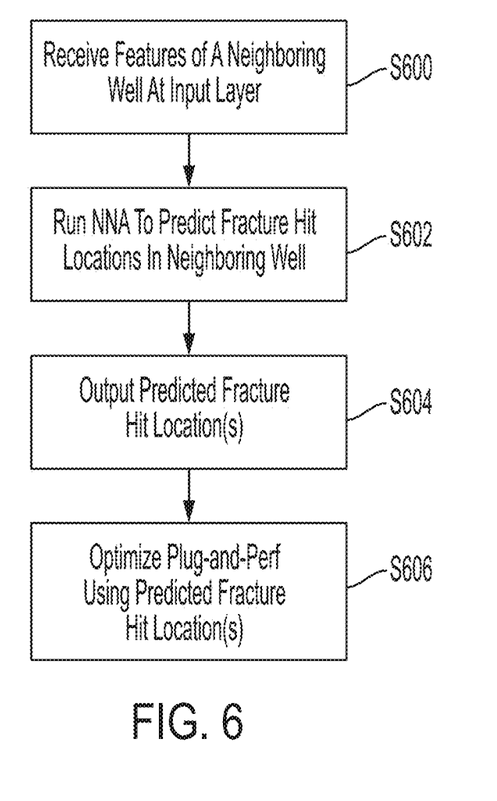
FIG. 6 describes an example machine-learning based process for predicting locations of fracture hits in monitoring wells, according to an aspect of the present disclosure.

FIG. 6 describes an example machine-learning based process for predicting locations of fracture hits in monitoring wells, according to an aspect of the present disclosure. FIG. 6 will be described from the perspective of terminal 118. However, it will be understood that terminal 118 can have one or more processors configured to execute computer-readable instructions stored on one or more associated memories to implement functionalities of FIG. 6. While terminal 118 is used as an example device at which neural network 300 can be trained, the training need not be performed at terminal 118 but can instead be performed at any one or more remote terminals (e.g., cloud based) using LFDAS data collected from network 200. FIG. 6 may be described in relation to any one or more of FIGS. 1-5.

At S600, terminal 118 may receive a set of features for a given channel of a monitoring well (e.g., an acoustic channel (~1 m long in one example) along a fiber optic cable used for DAS within a monitoring well), this channel may be referred to as an acoustic channel of a first well such as well 204 of FIG. 2, when hydraulic fracturing is being performed in an injection well (second well such as well 202 of FIG. 2). The set of features may be values of example eight features described above with reference to S402 of FIG. 4 (i.e., $\varepsilon_d$, $F_H(\varepsilon_d)$, A, $F_H(A)$, $\varepsilon_p$ $F_H(\varepsilon_p)$, D and $F_H(D)$).

At S602, terminal 118 may execute trained neural network 300 with the set of features as inputs to determine a probability of a fracture hit in the monitoring well (e.g., well 204) during a completion stage.

At S604, terminal 118 may determine the output (i.e., a probability of a fracture hit in the monitoring well) of the executed neural network 300. Terminal 118 may display the output on a screen of terminal 118 to a user at terminal 118.

At S606, the output (i.e., a probability of a fracture hit in the monitoring well) may then be used in designing the completion of the second well such as well 202 (e.g., designing plug-and-pref process for well 202).

Figure 7:
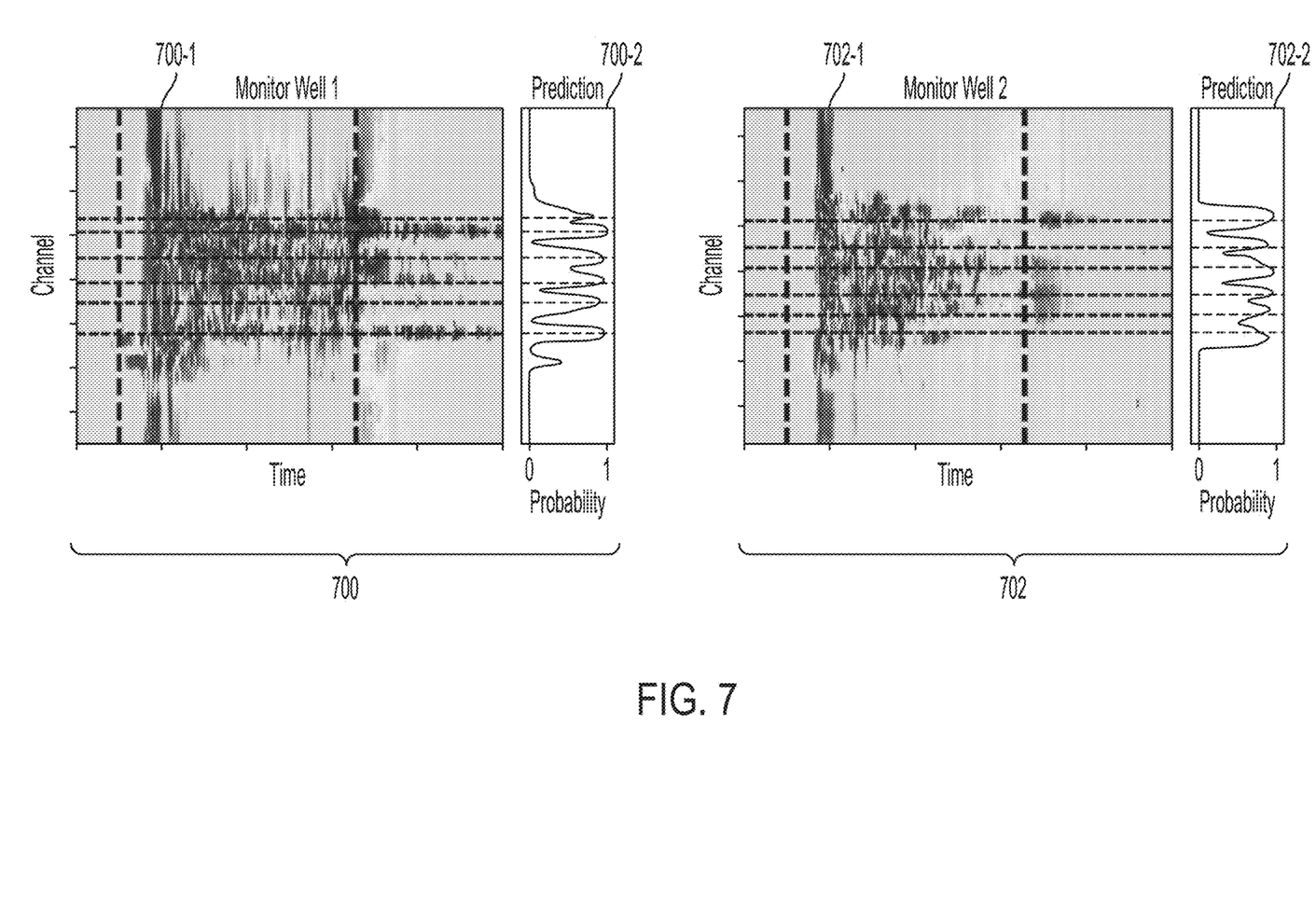
FIG. 7 is an illustration of a result of implementing the process of FIG. 6 to two monitoring wells, according to one aspect of the present disclosure.

FIG. 7 is an illustration of a result of implementing the process of FIG. 6 to two monitoring wells, according to one aspect of the present disclosure. FIG. 7 includes illustration 700 of monitoring well 206 when well 202 is being fracked (which is included as part of the test dataset). In other words, illustration 700 indicates that when features for well 206 from preprocessed LFDAS data (700-1) are inputted into neural architecture 300, the prediction output 700-2 is provided as output.

FIG. 7 further includes illustration 702 of monitoring well 204 when well 202 is being fracked (which is included as part of the test dataset). In other words, illustration 702 indicates that when features for well 204 from preprocessed LFDAS data (702-1) are inputted into neural architecture 300, the prediction output 702-2 is provided as output.

FIG. 7 illustrates no significant difference between prediction outputs 700-2 and 702-2, which illustrates the functionality and benefit of using machine-learning based prediction of fracture hits in adjacent/monitoring wells.

Examples described above provide an unsupervised machine learning technique for predicting locations of fracture hits in monitoring wells without relying on manual and human interaction for such detections, which are time consuming and costly.

Figure 8:
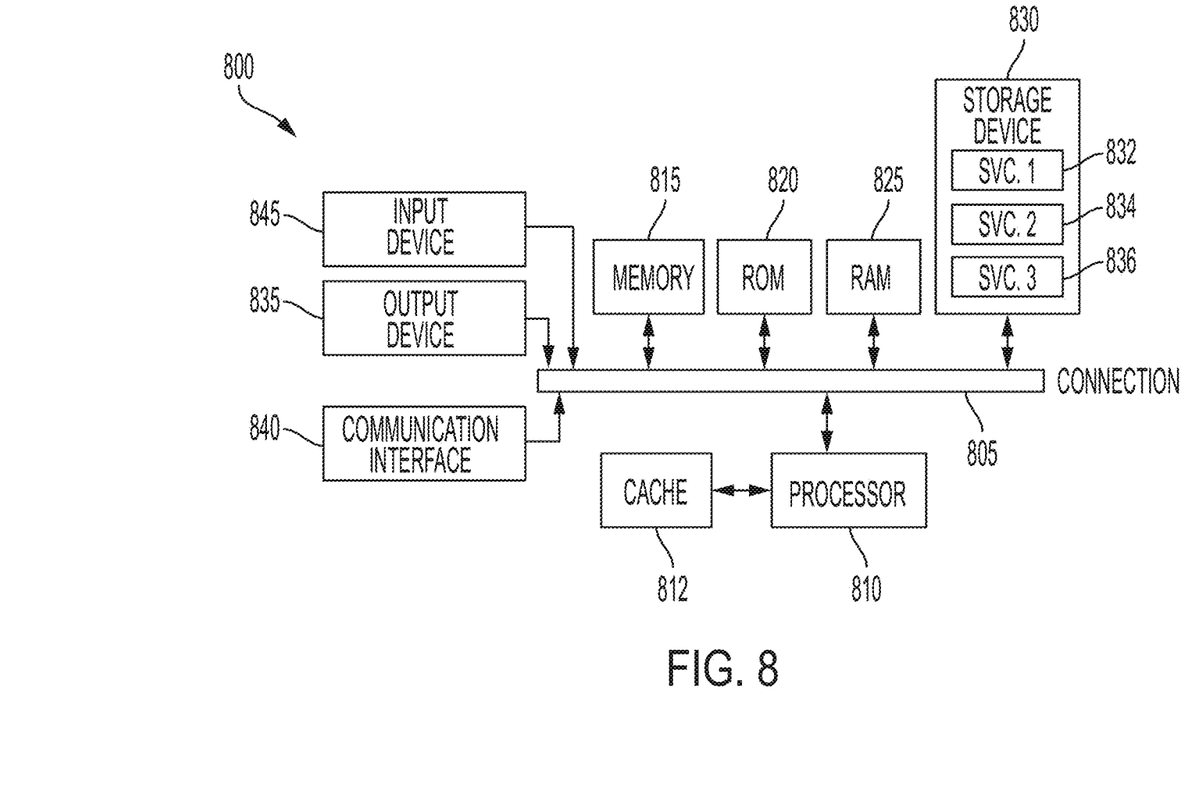
FIG. 8 which illustrates an example computing system, according to one aspect of the present disclosure.

Having described examples of machine learning based fracture-hit detection and estimation, the disclosure now turns to FIG. 8 which illustrates an example computing system, according to one aspect of the present disclosure. Computing system or simply system 800 of FIG. 8, can be implemented as terminal 118 or any other component for performing machine learning based determination of a probability of fracture hit in a monitoring well, as described above. System 800 can include components in electrical communication with each other using a connection 805, such as a bus. System 800 includes a processing unit (CPU or processor) 810 and connection 805 that couples various system components including the system memory 815, read only memory (ROM) 820 and/or random access memory (RAM) 825, to the processor 810. System 800 can include a cache 812 of high-speed memory connected directly with, in close proximity to, or integrated as part of processor 810. System 800 can copy data from memory 815 and/or storage device 830 to cache 812 for quick access by processor 810. In this way, cache 812 can provide a performance boost that avoids processor 810 delays while waiting for data. These and other modules can control or be configured to control processor 810 to perform various actions. Other system memory 815 may be available for use as well. Memory 815 can include multiple different types of memory with different performance characteristics. Processor 810 can include any general purpose processor and a hardware or software service, such as service 1 832, service 2 834, and service 3 836 stored in storage device 830, configured to control processor 810 as well as a special-purpose processor where software instructions are incorporated into the actual processor design. Processor 810 may be a completely self-contained computing system, containing multiple cores or processors, a bus, memory controller, cache, etc. A multi-core processor may be symmetric or asymmetric.

To enable user interaction with system 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with system 800. Communications interface 840 can generally govern and manage the user input and system output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof.

Storage device 830 can include service 1 832, service 2 834 and/or service 3 836 for execution by processor 810 to cause processor 810 to carryout functionalities described above with reference to FIG. 2. Other hardware or software modules are contemplated. Storage device 830 can be connected to connection 805. In one aspect, a hardware module that performs a particular function can include the software component stored in a computer-readable medium in connection with the necessary hardware components, such as processor 810, connection 805, output device 835, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items in the claims and/or specification refers to any combination of those items, including single members or multiple members. As an example, "at least one of a, b, and c" is intended to cover a; b; c; a and b; a and c; b and c; or a, b and c.

What is claimed is:

1. A computer-implemented method comprising:
receiving a set of features for a first well proximate to a second well, the second well undergoing a hydraulic fracturing process for extraction of natural resources from underground formations, and the set of features including:
a summation strain rate, at a location associated with the set of features, during a set period; and
filtered data corresponding to the summation strain rate;
inputting the set of features into a trained neural network; and
providing, as output of the trained neural network, a probability of a fracture hit at the location associated with the set of features in the first well during a given completion stage of the hydraulic fracturing process in the second well.

2. The computer-implemented method of claim 1, wherein the set of features corresponding to an acoustic channel along a fiber optic cable used within the first well for distributed acoustic sensing of fracture hits in the first well from the second well.

3. The computer-implemented method of claim 1, wherein the probability of the fracture hit is used in designing plug-and-pref hydraulic fracturing process in the second well.

4. The computer-implemented method of claim 1, further comprising:
training the trained neural network using a set of low frequency distributed acoustic sensing based data collected from a network of wells formed of a plurality of pairs of injecting-monitoring well pairs.

5. The computer-implemented method of claim 4, wherein the training includes manually identified fracture hits within the data, at one or more acoustic channels within one of more monitoring wells of the network.

6. The computer-implemented method of claim 1, wherein the summation strain rate is a first summation strain rate, the filtered data is first filtered data, and the set of features further includes:
a second summation strain rate at the location after the set period;
second filtered data corresponding to the second summation strain rate;
a Root Mean Square (RMS) of individual channel amplitudes during the set period;
third filtered data corresponding to the RMS;
a sum of absolute values of a difference between an acoustic channel corresponding to the location and locations that are a threshold number of acoustic channels apart from the acoustic channel; and
fourth filtered data corresponding to the sum of the absolute values.

7. The computer-implemented method of claim 1, wherein the second well is a horizontal well.

8. A device comprising:
one or more memories having computer-readable instructions stored therein; and
one or more processors configured to execute the computer-readable instructions to:
receive a set of features for a first well proximate to a second well, the second well undergoing a hydraulic fracturing process for extraction of natural resources from underground formations, and the set of features including:
a summation strain rate, at a location associated with the set of features, during a set period; and
filtered data corresponding to the summation strain rate;
input the set of features into a trained neural network; and
provide, as output of the trained neural network, a probability of a fracture hit at the location associated with the set of features in the first well during a given completion stage of the hydraulic fracturing process in the second well.

9. The device of claim 8, wherein the set of features corresponding to an acoustic channel along a fiber optic cable used within the first well for distributed acoustic sensing of fracture hits in the first well from the second well.

10. The device of claim 8, wherein the probability of the fracture hit is used in designing plug-and-pref hydraulic fracturing process in the second well.

11. The device of claim 8, wherein the one or more processors are further configured to execute the computer-readable instructions to train the trained neural network using a set of low frequency distributed acoustic sensing based data collected from a network of wells formed of a plurality of pairs of injecting-monitoring well pairs.

12. The device of claim 11, wherein the one or more processors are further configured to execute the computer-readable instructions to train the trained neural network based on manually identified fracture hits within the data, at one or more acoustic channels within one of more monitoring wells of the network.

13. The device of claim 8, wherein the summation strain rate is a first summation strain rate, the filtered data is first filtered data, and the set of features further includes:
a second summation strain rate at the location after the set period;
second filtered data corresponding to the second summation strain rate;
a Root Mean Square (RMS) of individual channel amplitudes during the set period;
third filtered data corresponding to the RMS;
a sum of absolute values of a difference between an acoustic channel corresponding to the location and locations that are a threshold number of acoustic channels apart from the acoustic channel; and
fourth filtered data corresponding to the sum of the absolute values.

14. The device of claim 8, wherein the second well is a horizontal well.

15. One or more non-transitory computer-readable media comprising computer-readable instructions, which when executed by one or more processors, cause the one or more processors to:
receive a set of features for a first well proximate to a second well, the second well undergoing a hydraulic fracturing process for extraction of natural resources from underground formations, and the set of features including:
a summation strain rate, at a location associated with the set of features, during a set period; and
filtered data corresponding to the summation strain rate;
input the set of features into a trained neural network; and
provide, as output of the trained neural network, a probability of a fracture hit at the location associated with the set of features in the first well during a given completion stage of the hydraulic fracturing process in the second well.

16. The one or more non-transitory computer-readable media of claim 15, wherein the set of features corresponding to an acoustic channel along a fiber optic cable used within the first well for distributed acoustic sensing of fracture hits in the first well from the second well.

17. The one or more non-transitory computer-readable media of claim 15, wherein the probability of the fracture hit is used in designing plug-and-pref hydraulic fracturing process in the second well.

18. The one or more non-transitory computer-readable media of claim 15, wherein execution of the computer-readable instructions further cause the one or more processors to train the trained neural network using a set of low frequency distributed acoustic sensing based data collected from a network of wells formed of a plurality of pairs of injecting-monitoring well pairs.

19. The one or more non-transitory computer-readable media of claim 18, wherein execution of the computer-readable instructions further cause the one or more processors to train the trained neural network based on manually identified fracture hits within the data, at one or more acoustic channels within one of more monitoring wells of the network.

20. The one or more non-transitory computer-readable media of claim 15, wherein the summation strain rate is a first summation strain rate, the filtered data is first filtered data, and the set of features further includes:
a second summation strain rate at the location after the set period;
second filtered data corresponding to the second summation strain rate;
a Root Mean Square (RMS) of individual channel amplitudes during the set period;
third filtered data corresponding to the RMS;
a sum of absolute values of a difference between an acoustic channel corresponding to the location and locations that are a threshold number of acoustic channels apart from the acoustic channel; and
fourth filtered data corresponding to the sum of the absolute values.

* * * * *